(12) United States Patent
Gwozdz et al.

(10) Patent No.: US 10,303,787 B2
(45) Date of Patent: *May 28, 2019

(54) FORGETTING ITEMS WITH KNOWLEDGE BASED SYNCHRONIZATION

(71) Applicant: Microsoft Technology Licensing, LLC, Redmond, WA (US)

(72) Inventors: Lukasz Gwozdz, Issaquah, WA (US); Michael Ray Clark, Redmond, WA (US); Siva Muhunthan, Redmond, WA (US); Lev Novik, Bellevue, WA (US); Ashish B. Shah, Hyderabad, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/784,659

(22) Filed: Mar. 4, 2013

(65) Prior Publication Data

US 2014/0250074 A1    Sep. 4, 2014
US 2017/0154064 A9    Jun. 1, 2017

Related U.S. Application Data

(63) Continuation of application No. 12/255,059, filed on Oct. 21, 2008, now Pat. No. 8,412,676.

(51) Int. Cl.
*G06F 17/30* (2006.01)

(52) U.S. Cl.
CPC .. *G06F 17/30356* (2013.01); *G06F 17/30575* (2013.01)

(58) Field of Classification Search
CPC .............. G06F 17/30578; G06F 17/30174
(Continued)

(56) References Cited

U.S. PATENT DOCUMENTS 6,256,634 B1    7/2001 Moshaiov et al.
6,757,896 B1    6/2004 Cohen
(Continued)

FOREIGN PATENT DOCUMENTS

EP    1845688 A1    10/2007
JP    2005222552 A    8/2005
(Continued)

OTHER PUBLICATIONS

Thomas Henderson, "With Windows 2000, NT Grows Up" retrieved from http://www.networkworld.com/reviews/2000/0103rev.html on Nov. 19, 2008, 10 pages.
(Continued)

*Primary Examiner* — Marc S Somers
(74) *Attorney, Agent, or Firm* — Davin Chin; Chin IP, PLLC

(57) ABSTRACT

Systems and methods that enable removal of data from an endpoint, while not propagating such removal to other endpoints when synchronizing data sources associated therewith. A designation component can indicate items as forgotten items, wherein such items are being known to an endpoint and deleted therefrom—yet, reintroduced therein and reappearing (e.g., as a create) upon re-synchronizing with the replica over again. Moreover, the forgotten items can employ additional metadata such as in from of an additional bit that indicates whether an item is a forgotten item.

20 Claims, 9 Drawing Sheets

(58) Field of Classification Search
USPC ....... 707/609, 610, 624, 625, 634, 637, 638, 707/687, 690, 694
See application file for complete search history.

(56) References Cited

U.S. PATENT DOCUMENTS

| | | | |
|---|---|---|---|
| 7,209,911 | B2 | 4/2007 | Boothby |
| 7,290,019 | B2* | 10/2007 | Bjorner et al. ............... 707/638 |
| 7,337,193 | B1 | 2/2008 | Mills |
| 7,440,985 | B2 | 10/2008 | Novik |
| 8,412,676 | B2 | 4/2013 | Gwozdz et al. |
| 2004/0177100 | A1 | 9/2004 | Bjorner et al. |
| 2005/0027756 | A1* | 2/2005 | Pettigrew ..................... 707/204 |
| 2005/0044089 | A1 | 2/2005 | Wu et al. |
| 2005/0044187 | A1 | 2/2005 | Jhaveri et al. |
| 2005/0086272 | A1* | 4/2005 | Novik et al. ................. 707/201 |
| 2005/0172296 | A1 | 8/2005 | Schleifer et al. |
| 2006/0242444 | A1 | 10/2006 | Novik et al. |
| 2007/0282914 | A1* | 12/2007 | Sivapragasam et al. ..... 707/200 |
| 2007/0299887 | A1* | 12/2007 | Novik et al. .................. 707/203 |
| 2008/0144669 | A1* | 6/2008 | Lee et al. ..................... 370/503 |
| 2009/0006495 | A1* | 1/2009 | Ramasubramanian et al. ............ 707/203 |
| 2009/0077002 | A1* | 3/2009 | Clark et al. ..................... 706/59 |

FOREIGN PATENT DOCUMENTS

| | | | |
|---|---|---|---|
| JP | 2007164523 | A | 6/2007 |
| JP | 2007527053 | A | 9/2007 |
| WO | WO2005024551 | A2 | 3/2005 |

OTHER PUBLICATIONS

"File synchronization and replication" retrieved from http://www.parallab.uib.no/resources/utilities/rsync-unison.pdf on Nov. 19, 2008, 10 pages.

"Set ScopeFilter with Modified Date?", retrieved from http://forums.microsoft.com/sync/ShowPost.aspx?PostID=3479605&SiteID=75 on Nov. 19, 2008, 2 pages.

International Preliminary Report on Patentability issued in PCT/US2009/060963 dated Apr. 26, 2011, 5 pages.

International Search Report and Written Opinion issued in PCT/US2009/060963 dated May 25, 2010, 11 pages.

Extended European Search Report issued in European Application No. 09822475.1 dated Dec. 18, 2014, 12 pages.

Lev Novik et al., "Peer-to-Peer Replication in WinFS," Published on Jun. 1, 2006, 17 pages.

Norman H. Cohen, "IBM Research Report; Design and Implementation of the MNCRS Java Framework for Mobile Data Synchronization," published on Aug. 11, 2000, 110 pages.

Saito Y et al: "Optimistic Replication," Microsoft Technical Report—MSR-TR-2003-60, Sep. 1, 2003, 52 pages.

Malkhi D. et al., "P2P Replica Synchronization with Vector Sets," Operating Systems Review, vol. 41, No. 2, Apr. 1, 2007, 8 pages.

Office Action issued in Japanese Application No. 2011-533244 dated Oct. 7, 2014, 4 pages.

Office Action issued in Japanese Application No. 2011-533244 dated Nov. 13, 2013, 6 pages.

Office Action issued in Chinese Application No. 200980142527.5 dated Nov. 5, 2012, 11 pages.

Office Action issued in Chinese Application No. 200980142527.5 dated Apr. 18, 2013, 6 pages.

"About Synchronization (One-Way,Two-Way), Backup and Replication", Retrieved From: https://web.archive.org/web/20180101052804/http://www.tgrmn.com:80/web/kb/item78.htm, Retrieved On: May 30, 2018, 4 Pages.

"Office Action Issued in European Patent Application No. 09822475.1", dated Jun. 12, 2018, 5 Pages.

"Office Action Issued in European Patent Application No. 09822475.1", dated Mar. 6, 2018, 4 Pages.

"Office Action Issued in European Patent Application No. 09822475.1", dated Oct. 25, 2018, 5 Pages.

* cited by examiner

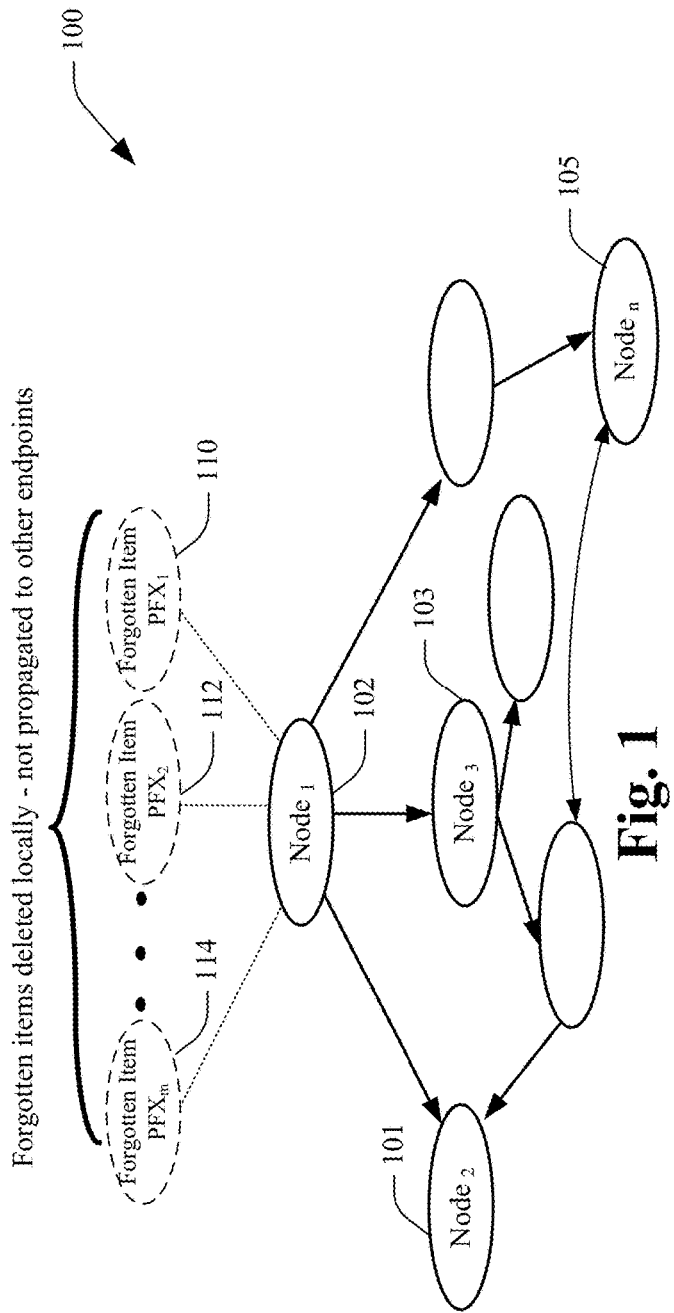
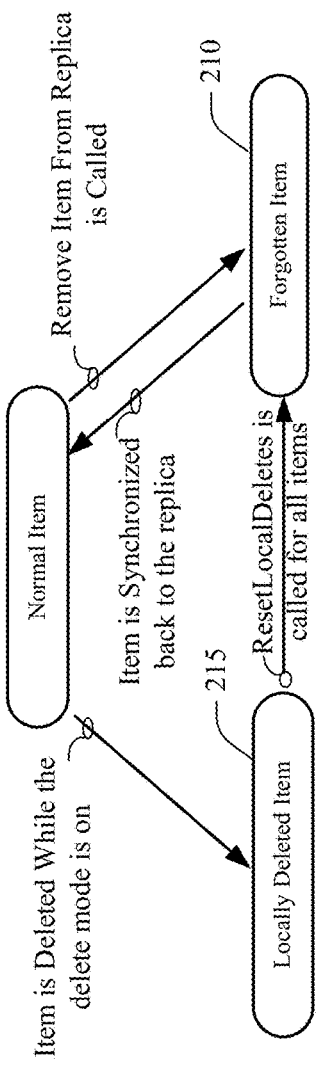
Fig. 1
Fig. 2

FORGETTING ITEMS WITH KNOWLEDGE BASED SYNCHRONIZATION

CROSS-REFERENCE TO RELATED APPLICATIONS

This application is a continuation of U.S. patent application Ser. No. 12/255,059, filed Oct. 21, 2008, which is titled "FORGETTING ITEMS WITH KNOWLEDGE BASED SYNCHRONIZATION," the entire contents of which are incorporated herein by reference.

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Often a user stores the same information in more than one device or location, and replication, or synchronization, of data is a process typically employed to ensure that each data store has identical information. For example, a user can maintain an electronic address book or a set of email messages in a myriad of different devices or locations. Such user can further modify the contact information or send/receive email addresses using applications associated with each location. Regardless of where or how a change is made, a major goal of replication is to ensure that a change made on a particular device or in a particular location is ultimately reflected in other devices/stored locations.

One common replication method involves tracking changes that have occurred subsequent to a previous replication. For example, a device that seeks to replicate with another device can submit a request for changes to such other device. It is desirable that the changes that the other device sends are those that have occurred since the last replication. The device, or "replica," that responds to a request for updated information can check for any changes that are time stamped subsequent to a previous replication. Any changes with such a time stamp can subsequently be sent to the device requesting replication. Typically, such replication requires that each replica be aware of the other replicas or the replication topology in which it is operating. Each replica can further maintain a record of what changes have been replicated on other replicas. In effect, each replica can maintain information about what it believes is stored on the other replicas within the topology.

The challenges of replication become more complicated when more than two replicas are included in the same sync community or topology. Among these challenges are problems involving replacing more current data with outdated data based on the order devices are replicated, replicating data that may already be in sync, and having data that is in sync be reported as being in conflict.

As one example, consider a sync community that includes three replicas. A user updates replica 1 at time 1. At time 2, the same data is updated in replica 2. Replica 2 then replicates with replica 3 and the changes made in replica 2 are incorporated into replica 3. If replica 3 subsequently receives changes from replica 1, the data originally updated on replica 2 may be replaced with the original data from replica 1, even though the change from replica 1 is not the most recent change.

Moreover, communication resources can be inefficiently allocated if replicas incorrectly believe that their information is out of sync, and hence perform unnecessary sync operations. In the three replica sync community example above, if a user updates replica 1, such changes can then replicated to replica 2. Replica 2 can then replicates its changes to replica 3, wherein information from replica 2 (which is currently also the information from replica 1) is changed on replica 3. Likewise, replica 3 can then replicate with replica 1. In some cases, replica 3 may know that replica 1 has been updated—yet not know the version of information on replica 1. As such, replica 3 may replicate its information to replica 1, even though the same information is already on replica 1. Further, additional needless replications may continue as replica 1 replicates with replica 2 or performs other pair-wise replications at subsequent times.

Other replication challenges involve replicated data that actually appear as being in conflict, even when no actual conflict exists. In the example given above, initially information on replica 1 can be updated and replicated to replica 2. Subsequently, the information on replica 1 can then be replicated to replica 3. Replicas 2 and 3 then attempt a replication only to discover that they each have changes (from the replication with replica 1) that have occurred since their last replication. Even though the changes are the same, nonetheless replicas 2 and 3 may conclude that a conflict exists.

Another set of problems relate to partial replication of data in a data store at a particular time. For example, the data store can include email messages in various folders such as an inbox folder or other folders including folders that contain saved email messages. In some cases, a user desires to replicate changes to all of the email folders (e.g., when the communications bandwidth between replicating devices is large), while in cases of more limited bandwidth replication is only required for particular folders, such as an inbox.

In another example, a user can synchronize only part of their entire set of data in all cases. For instance, a user may desire to maintain all email on a desktop computer or server, but only synchronize their inbox and a selected set of folders to a small device that has limited storage. In such case, some information may never be synchronized with a particular device.

In another example, a data store can include digital music files wherein users can synchronize entire digital music libraries with a portable music player or computer with a large hard drive. Such users may also desire to employ a small portable music player with a limited amount of flash memory, on which they only want to store a selected set of music. In one example, such music to be synchronized can further include digital music files with predetermined qualities (e.g., rated with "four stars" or "five stars," or downloaded in a particular time frame.)

In addition, when synchronizing a particular set of data various additional problems can arise. For example, data may fit the criteria of a filter and be in a desired set of data at one time or on one device, yet not fit such criteria (and hence not be in the desired set of data) at another time or on another device. Additionally, each replica may need to continue to maintain an understanding of the data it has synchronized from different devices, even when that data may, for example, be a subset of the full set of data during some synchronizations, and the full set of data during other synchronizations.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation enables removal of data from an endpoint, while not propagating such removal to other endpoints when synchronizing data sources associated therewith—via implementing "forgotten items". Such forgotten items represent items that can be removed locally from a synchronization endpoint, and yet do not result in removal at other nodes during synchronization (e.g., failing an automatic removal/deletion as a result of synchronization.) Accordingly, items that are designated as "forgotten" represent items being known to an endpoint and deleted therefrom—yet, reintroduced therein and reappearing (e.g., as a create) upon re-synchronizing with the replica over again. Such is in contrast to locally deleted items that are never reintroduced, unless the user/replica resets the local deletes (requiring an explicit act), at which point they effectively become forgotten items and can be synced back. Moreover, the forgotten items can employ additional metadata such as in form of an additional bit that indicates whether an item is a forgotten item. Typically, a replica can maintain metadata represented as "knowledge" that facilitates efficient replication.

In a related aspect, forgetting items that have never been modified locally (last modified local counter such as "tickcount=0") can be readily performed by having their metadata and data fully removed. Moreover, since typically the replica never modified such item, such replica knows about all the local changes performed thereon. In another aspect, forgetting items that have been modified locally (last modified local "tickcount>0") can have their data removed, yet their sync metadata should be preserved, wherein the bit indicating that the item is forgotten is set to TRUE.

Likewise, regarding scenarios for remembering a forgotten item in one aspect, items that are forgotten with no metadata kept because they were never modified locally, can be synced regularly during a synchronization session and without a requirement for performance of any additional acts. Moreover, items that older versions thereof were known by the target end point, and yet the most recent modification tickcount is not contained in the source's knowledge require additional acts, which can include one or more of:

1) Keeping reduced knowledge for such items (requires special knowledge operations and/or splitting the knowledge into two pieces). Local updates to such items require changing the replica ID, at least for those items or possibly for the whole replica;

2) Deferring changes that are not aware about all local modifications—even though not synchronizing older versions of the item;

3) Raising a conflict when an older version of an item is detected and requiring user intervention; and 4) Changing the replica ID when an older version of an item comes in.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 1 illustrates a block diagram of a synchronization system that implements a forgotten item according to an aspect of the subject innovation.

FIG. 2 is a block diagram that illustrates contrasts between a deleted item and a forgotten item according to an aspect of the subject innovation.

DETAILED DESCRIPTION

Figure 3:
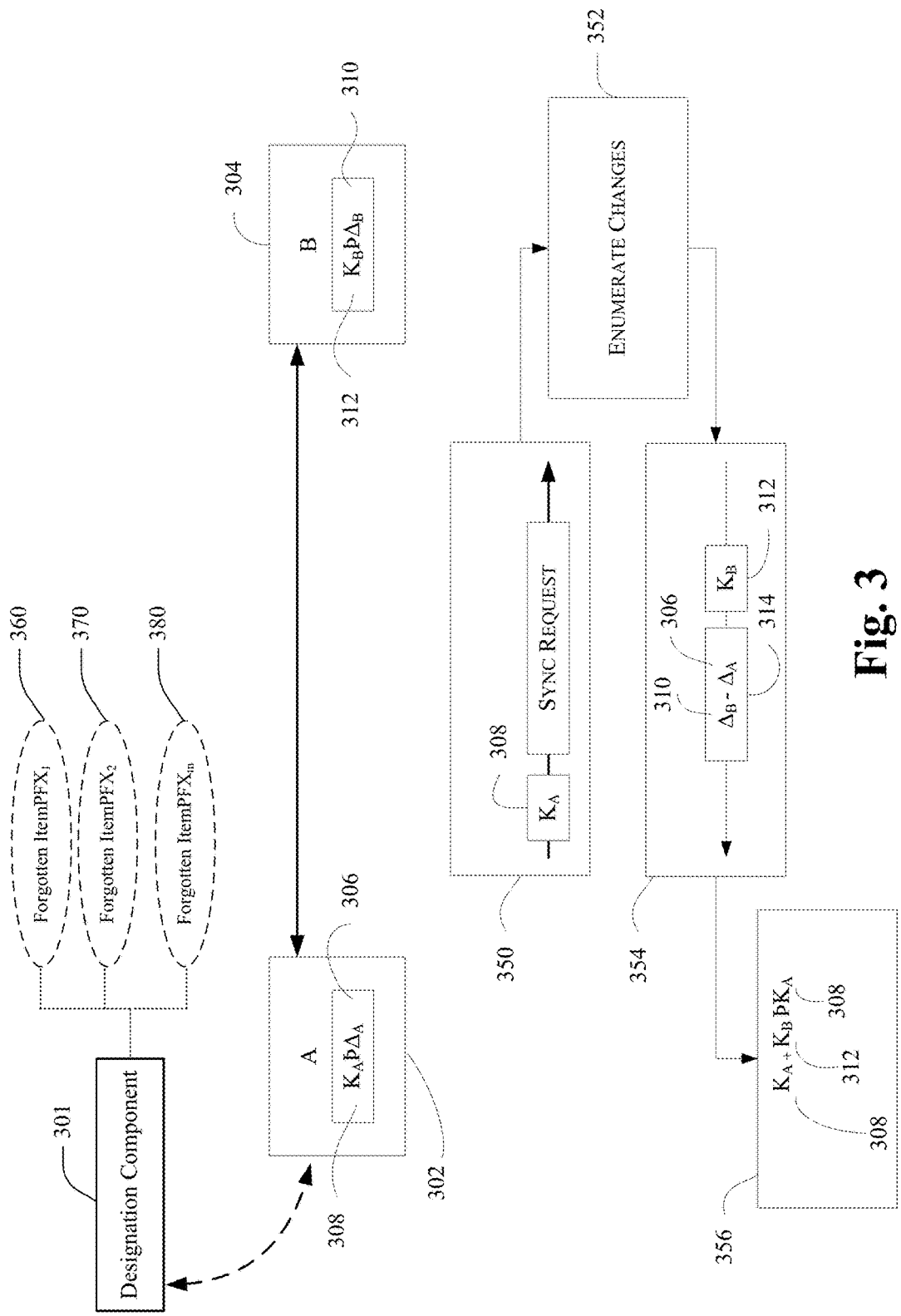
FIG. 3 illustrates a block diagram for a designation component that designates items as forgotten items according to a further aspect.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

FIG. 1 illustrates a network 100 of endpoints representing a synchronization community that implements forgotten items during synchronization in accordance with an aspect of the subject innovation. The network of endpoints 100 removes data from endpoint 102, while not propagating such removal to other endpoints 101, 103, 105 (1 to n, where n is an integer) when synchronizing data sources associated therewith—via designating items as forgotten items 110, 112, 114 (1 to n, n being an integer). The forgotten items 110, 112, 114 represent items that can be removed locally from the synchronization endpoint 102, and yet do not result in deletions at other nodes 101, 103, 105 during the synchronization process.

Each of the endpoints 101, 102, 103, 105 can be electronically coupled to a respective replica through a communication link. In this sync community 100, although not all of the replicas are directly connected through communication links, changes in any of the replicas can be replicated to any of the other replicas within the sync community 100.

For example, a change performed on an item in an endpoint can be associated with a "change ID," which can include a pair that contains the ID of a replica and a version associated with that change. Moreover, the change ID can include designations that indicate such change is performed or associated with replica "A" and for a version associated therewith.

Each replica associated with a node can maintain metadata that represents "knowledge" that facilitates efficient replication. For example, such knowledge can include metadata that represents changes for which the particular replica is aware. Accordingly, other replicas can be relieved from tracking what any other particular replica already knows, as this information can be effectively represented by the knowledge maintained by each replica.

Such metadata or knowledge can be stored or represented in a plurality of ways, to support operations, such as: (1) addition of a change to the representation of knowledge, (2) evaluation of whether a change is included in the representation of knowledge, and (3) combination of two representations of knowledge together, to form a single representation of knowledge. For example, knowledge can be represented as a vector of pairs or change IDs where each pair or change ID is the ID of a replica and a maximum version associated with that change. Such a representation can be referred to as a "knowledge vector."

A replica that desires to synchronize its data with another replica; (wherein a replica that desires to receive any changes it does not have from another replica)—can initially supply its knowledge to the other replica. Moreover, to reduce the amount of data representing knowledge that is to be sent between replicating replicas, the knowledge can further be expressed as a knowledge vector as explained earlier. Thus, the knowledge that is sent between the replicas does not need to include every change ID, but can be in the form of a vector that represents a number of change IDs. The other replica can further employ the knowledge it has received from the first replica to enumerate any changes it has that the first replica does not, and then send any such changes back to the first replica.

Subsequently, the first replica can then evaluate whether any of the received changes conflict with any changes it maintains and then incorporate any changes it deems appropriate or valid (e.g., non-conflicting) into its data store. The first replica can also update its knowledge representation so that knowledge representation includes the new changes it has received.

It is to be appreciated that a single replication can transfer changes from one replica to another. Likewise, to accomplish a replication between two replicas so that both replicas have changes from the other replica, two one-way synchronizations or replications can be performed, in parallel—e.g., at the same time—or synchronously, one after the other. In other aspects, changes can only flow in one direction—wherein a replica can incorporate changes from another replica—yet not change the data in such other replica (e.g., a one-way synchronization).

In other aspects, a filter can also be specified or provided during a synchronization request, wherein such filter represents a construct that serves to identify a particular set of items in a data store. Moreover, during replication, the changes identified by the replica enumerating changes can then be filtered using the filter so that only changes that are identified by the filter are returned to the requestor. For example, in a filtered replica represented by a mobile phone, storage constraint can warrant deletions of items that are inside the replica's filter locally, wherein a filter identifies, in part or in whole, a particular set of data that is replicated between replicas.

FIG. 2 illustrates an exemplary contrast between implementing a forgotten item 210 of the subject innovation and a locally deleted item 215 according to a further aspect. Such forgotten item 210 is in contrast to a locally deleted item 215 that is never reintroduced, unless the user/replica resets the local deletes (requiring an explicit act), at which point they effectively become forgotten items and can be synced back. Moreover, the forgotten items 210 can employ additional metadata such as in from of an additional bit that indicates whether an item is a forgotten item. Typically, a replica can maintain metadata represented as "knowledge" that facilitates efficient replication. Accordingly, such deleted items should not reappear upon occurrence of a next sync. In contrast, as the replica's filter and items change—the replica forgets items that fall outside the replica's filter, and such forgotten items should come back as soon as they move back into the filter.

FIG. 3 illustrates a designation component 301 that designates items as forgotten items 360, 370, 380 that can be associated with a replica A 302. Such forgotten items 360, 370, 380 represent items that can be removed locally from a synchronization endpoint, and yet do not result in deletions at other nodes during synchronization. Accordingly, items that are designated as "forgotten" represent items being known to an endpoint and deleted therefrom—yet, reintroduced therein and reappearing (e.g., as a create) upon re-synchronizing with the replica over again.

The following discussion relates to general synchronization between endpoints A, B, by two replicas: replica A 302 and replica B 304. In general, changes are desired to be transferred from an end point to another end point. Nonetheless, if items are designated forgotten items removal of such items from one end point, such items are not removed from another end point during synchronization.

Replica A 302 includes knowledge 308, in this example labeled $K_A$. The knowledge 308 can include a list of change IDs. Replica A 302 further includes a set of changes 306, in this example labeled $\Delta_A$. Similarly, replica B 304 includes a knowledge 312 labeled $K_B$ and set of changes 310 labeled $\Delta_B$ and each associated with a change ID.

To begin the replication, in operation 350 at time 1, replica A 302 sends a sync request to replica B 304. The sync request includes replica A's knowledge 308. In one particular aspect of operation 352, referred to as "change enumeration," Replica B 304 may then compare the knowledge 308 to the versions associated with each of the changes in its set of changes 310, and thereby make decisions about which of its changes 310 are already in replica A's changes 306 as well as the changes not present in replica A's changes. Put differently, instead of examining each of the changes in replica B, replica B can compare the knowledge 308 to the version associated with each item maintained by replica B. Using either process, replica B can enumerate the changes of which replica A is not aware. For example, if the knowledge vector of replica A is A3B12 and replica B has current changes associated with versions that are change IDs B13 and B14, then the enumerated changes to be sent to the replica A can include those associated with the change IDs B13 and B14. In one aspect, only B14 can be sent if the changes identified by B13 and B14 were made to the same item.

As a result, in operation 354 at time 2, replica B 304 may send to replica A 302 only the portion of replica B's changes 310 that are associated with versions that are not included in the knowledge 308 of replica A. Such changes are illustrated using changes 314. In addition to the enumerated changes, replica B 304 can also send replica B's knowledge 312 to replica A 302.

In this example, replica A has knowledge of all of the changes that were originally in replica A, as long as those changes have not been superseded by the changes sent by replica B 304. In addition, replica B has sent all of the changes in replica B that were not already in replica A, hence replica A also has information about all of the changes of which replica B 304 was aware. Accordingly, in operation 356 at time 3, replica A may update its knowledge 308 to reflect the addition of the changes 314. In this case, this may be done simply by adding replica A's knowledge 308 to replica B's knowledge 312 and defining the result as the new value of replica A's knowledge 308. At this time, if not accomplished already, replica A can also incorporate any changes received from replica B.

Through this mechanism, an efficient replication is performed where only the needed changes are replicated and where the individual replicas are only required to maintain information about the changes that reside within the particular replica and previous changes about which the replica is aware.

In addition to enumerating changes, knowledge of a replica can also be used to detect conflicts between changes. This is a common task for replicas that have initiated a sync operation and received both changes and learned knowledge from another replica—the initiating replica may often then want to determine if any changes received from the other replica conflict with changes already in the replica. In this context, a conflict is defined as a change that was made without knowledge of another change. If a change was made with knowledge of another change, then the later change—the change made with knowledge of the other change—can be considered to be the definitive change and no conflict can be considered to have occurred.

Figure 4:
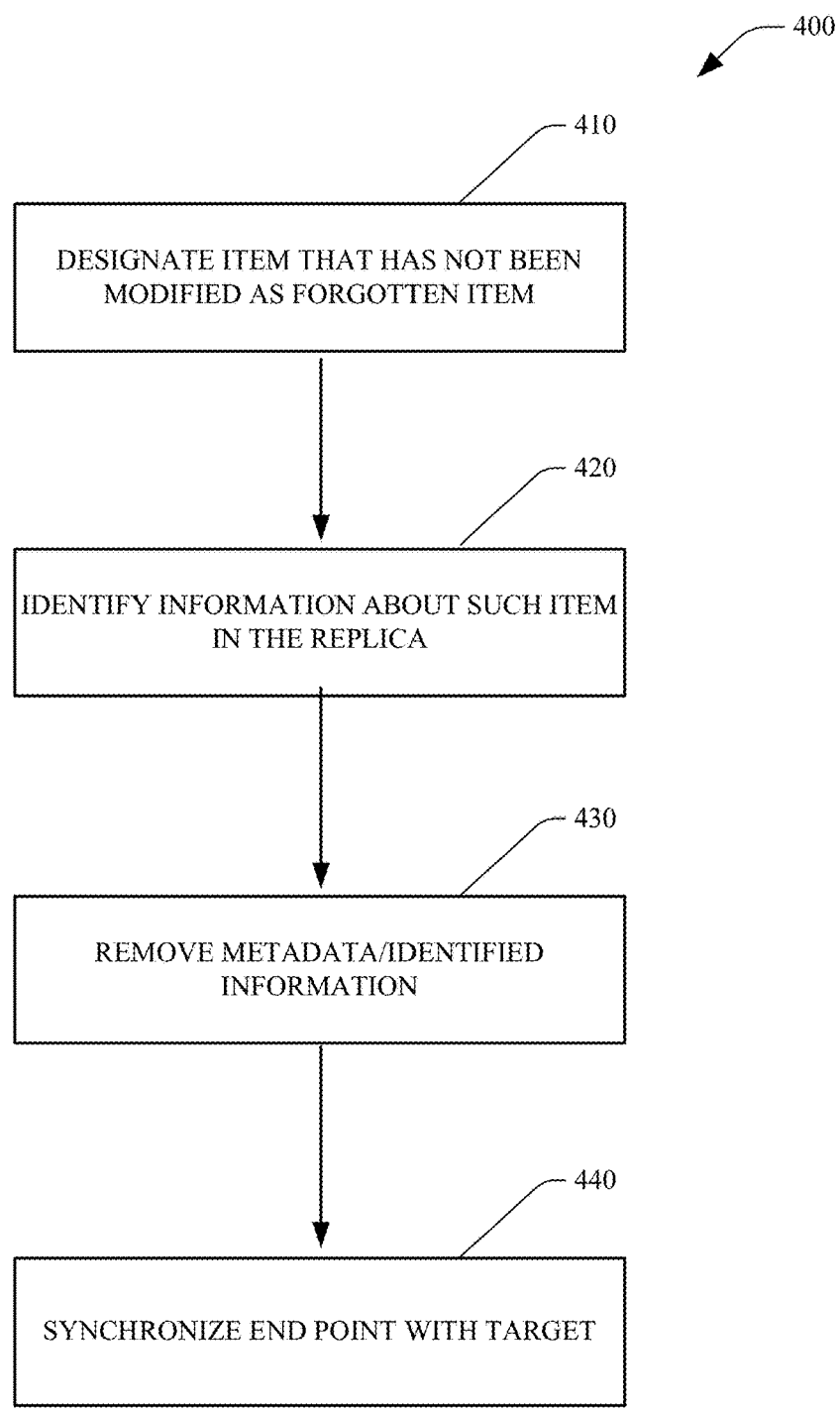
FIG. 4 illustrates a related methodology of implementing a forgotten item that has never been modified locally in accordance with an aspect of the subject innovation.

FIG. 4 illustrates a related methodology 400 of implementing a forgotten item that has never been modified locally in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially, and at 410 an item that has not been modified locally can be selected to be designated as a forgotten item. Such item can be identified if an associated last local modification tickcount is zero, and hence indicates that it has never been modified locally. Next, and at 420 since such item has never been modified by the replica—it thus knows about all local changes performed thereon, and such information can be identified. At 430, metadata and identified information can be fully removed from the endpoint. As such and at 440, the endpoint can then be synchronized with another endpoint and the forgotten item removed therefrom.

Figure 5:
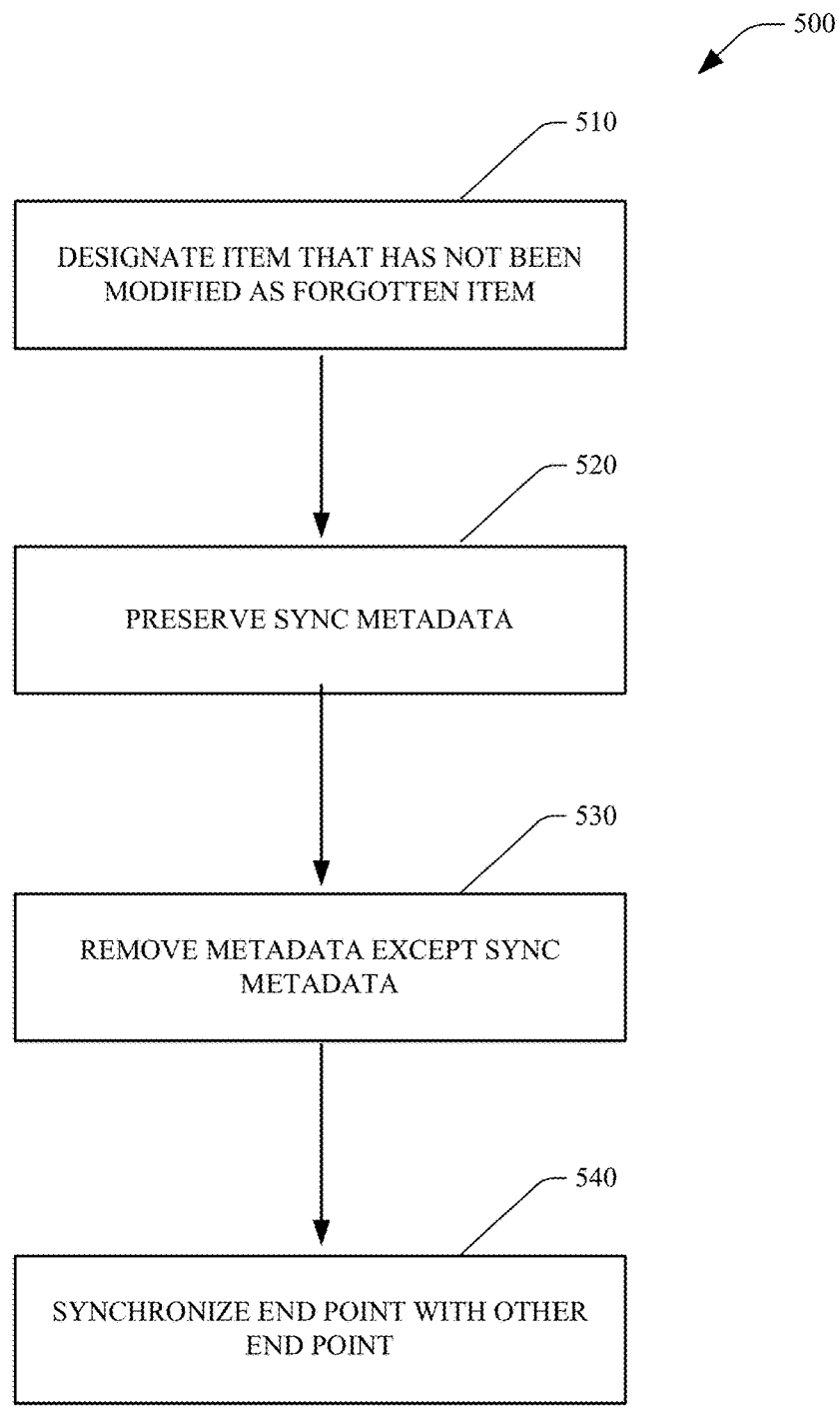
FIG. 5 illustrates a further methodology of designating an item that has been modified locally as a forgotten item.

FIG. 5 illustrates a further methodology 500 of designating an item that has been modified locally, as a forgotten item. Initially, and at 510 an item that has a last local modification tickcount of larger than 0 is selected. Such local tickcount indicates that the item has been modified locally. Subsequently, and at 520 sync metadata associated with such item is preserved and the item designated as a forgotten item. As such, and at 530 other data (e.g., except the preserved metadata) can be removed from the endpoint. The endpoint can then be synchronized with other endpoints, wherein the item designated as the forgotten item is removed locally from a synchronization endpoint, and yet such removal does not result in deletions at other nodes during synchronization.

Figure 6:
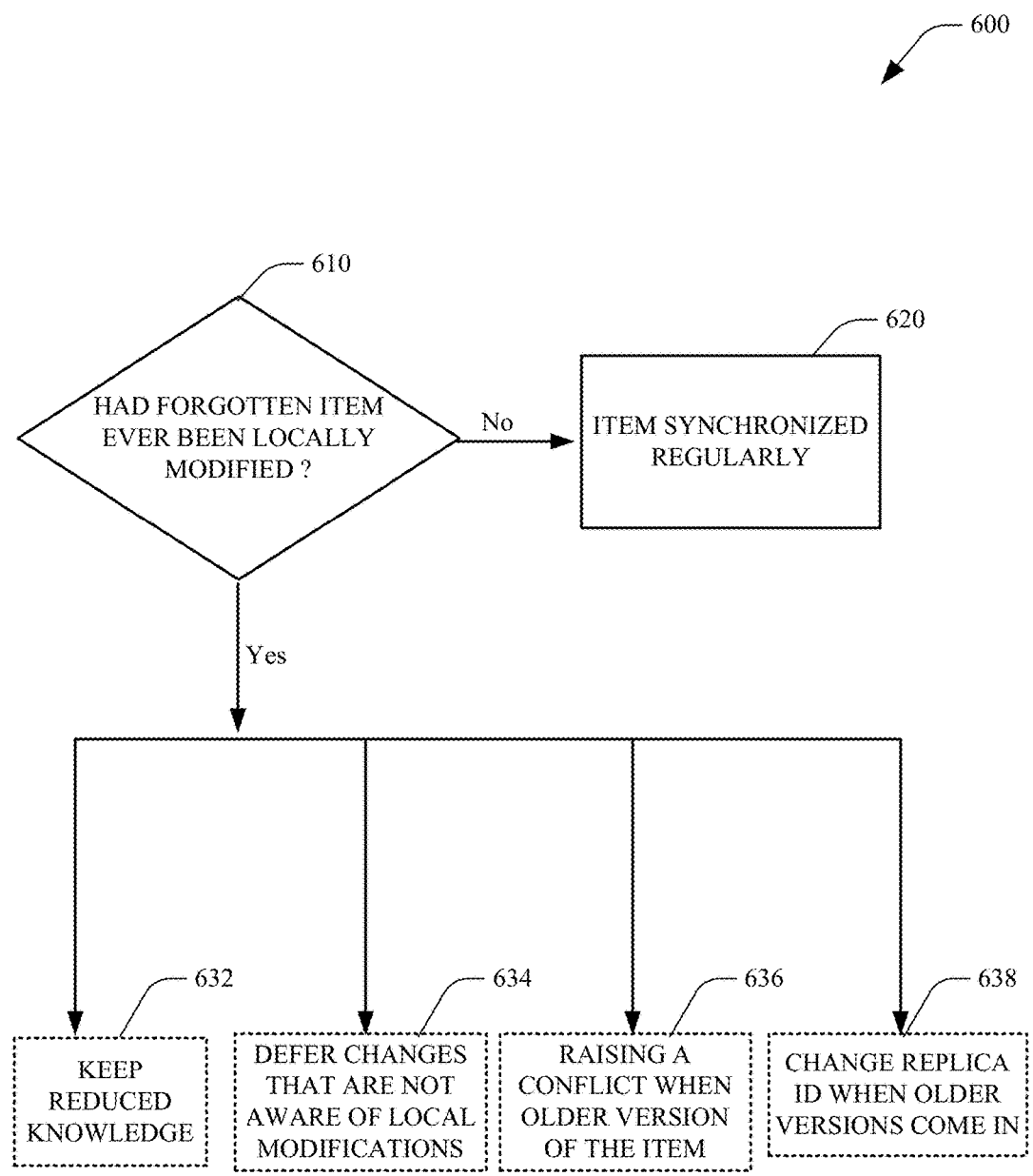
FIG. 6 illustrates a related methodology of remembering a forgotten item according to a further aspect of the subject innovation.

FIG. 6 illustrates a related methodology 600 of remembering a forgotten item according to a further aspect of the subject innovation. Initially, and at 610 a determination is made as to whether the forgotten item was deemed to have been locally modified. If not, such item can be synchronized at 620 in a regular fashion during a synchronization session and without a requirement for performance of any additional acts. Otherwise, the methodology proceeds to act 632, 634, 636, 638 wherein any or a combination of the following acts can be implemented:

At 632 the subject innovation can reduce knowledge for such items (requires special knowledge operations and/or splitting the knowledge into two pieces). Local updates to such items require changing the replica ID, at least for those items or possibly for the whole replica. At 634, the subject innovation can engage in deferring changes that are not aware about all local modifications—even though not synchronizing older versions of the item. At 636, another aspect can raise a conflict when an older version of an item is detected and requiring user intervention. Similarly and at 638, a further aspect can change the replica ID when an older version of an item comes in.

Figure 7:
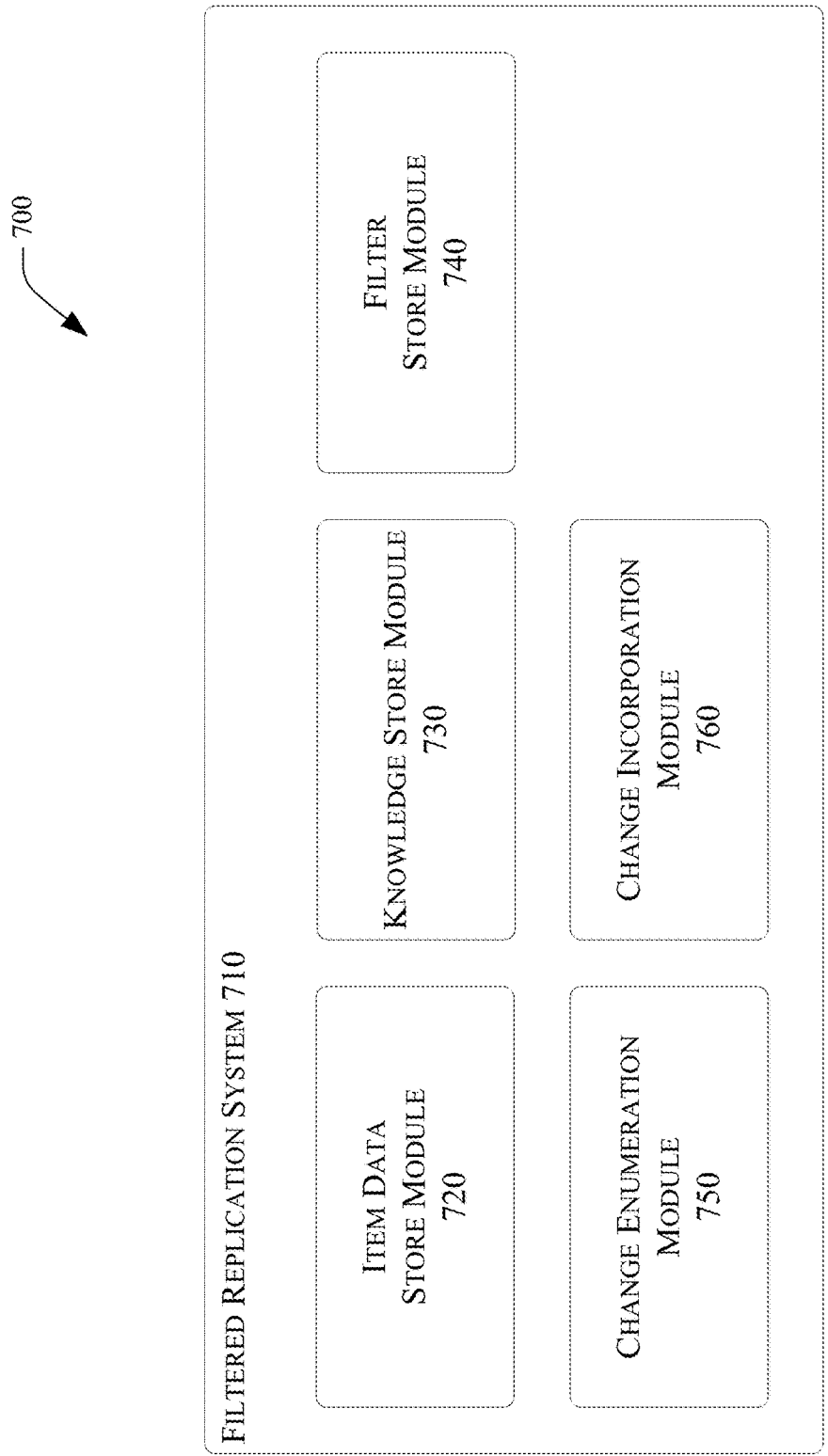
FIG. 7 illustrates an exemplary aspect of a system wherein filtered replication can be implemented in conjunction with designating forgotten items according to an aspect.

FIG. 7 illustrates an exemplary aspect of a system wherein filtered replication can be implemented in conjunction with designating forgotten items according to an aspect. The system 700 represents a filtered replication system 710, an item data store module 720, a knowledge store module 730, a filter store module 740, a change enumeration module 750, and a change incorporation module 760.

The item data store 720 can be configured to store and manage set of data being replicated by the filtered replication system. For example, the filtered replication system 710 can include email messages as part of its data, wherein the item data store module 720 can further store and provide access to email message data and other data relevant to storing and accessing email messages such as email folder information. In another aspect, the data stored by the item data store module 720 can include persistent data on a computing device, such as email messages an other computer-readable files of all types and that store all kinds of data (e.g., the data store module 720 can hold one or multiple versions of particular data items.)

In another aspect, the item data store module 720 can store differences between multiple versions of the same data item. Such can enable different complete versions to be constructed by applying one or more changes to a particular complete version of the data item. In additional aspects, the item data store module cannot store item data information itself and can instead provided access to such item data information stored elsewhere. The knowledge store module 730 can be configured to store and manage knowledge about the changes and data of which the filtered replication system 710 is aware. For example, the knowledge store module 730 can be configured to store, manage, and provide access to the knowledge vector, as well as other representations of knowledge.

Moreover, the filter store module 740 can be configured to store and manage data about filters used in replication. For example, the filter store module 740 can in some implementations be configured to store, manage, and provide access to filters, as predetermined by the system. As explained earlier, in other aspects, the filter store module may not store filter information itself and may instead provide access to such filter information stored elsewhere. Likewise, the change enumeration module 750 can be configured to perform the necessary tasks to receive a request for replication from another replica, identify changes of which the other replica is not aware, and return those changes and any other useful knowledge to the replica that initiated the request.

Such change incorporation module 760 can be configured to perform the necessary tasks to initiate and transmit a request for replication to another replica, and then, after the other replica has responded, to evaluate the returned data for conflicts and incorporate appropriate changes into the item data store module 720, knowledge store module 730, and/or filter store module 740.

The filtered replication system 710 contains various modules, discussed above, which can perform a variety of tasks and serve a variety of functions associated with replicating data using filters. It is to be appreciated that while the filtered replication system 710 contains various modules, in other aspects, a single module can perform more than one of the tasks or functions associated with modules in the system. For example, the item data store module 720 can be relied upon to store all data in the system, including data about items as well as data about knowledge and filters.

As another example, a single module can perform the tasks associated with the change enumeration module 750 and the change incorporation module 760. Similarly, the modules can perform additional related tasks and can reside on more than one computing device. For example, in one implementation the change enumeration module 750 and change incorporation module 760 can reside on a particular computing device while the item data store module 720, knowledge store module 730, and filter store module 740 reside on one or more other computing devices. As explained earlier, a plurality of metadata can be maintained for an item to be synchronized with designation presented as forgotten items. Such can include version information and identifier information end. Moreover, a local set tick count can maintain track of items that are modified locally. Likewise, information about device endpoint and notifying the source as to construction of the differences (e.g., delta as explained in detail infra) can be maintained if form of a "change request knowledge", wherein such change request knowledge can be constructed by excluding all the forgotten items that still have their metadata stored from the local knowledge by calling ExcludeItem. In addition, knowledge metadata can represent information pertaining to when source sends changes it can also supply destination what is already known about data that is being sent.

Regarding older versions of forgotten items, such older versions of forgotten items typically require changing the local replica ID. The end provider can then be questioned regarding the new replica ID and set an internal flag to change the replica ID at the end of the sync session. Moreover, all metadata for forgotten items that might have had to be kept can be removed (e.g., if assumed that such items designated as forgotten items are modified locally.)

The following provides for exemplary programmatic interfaces and APIs for other developers to generate synchronization providers for data sources, and employing the functionality of forgotten items. For example, the provider can be asked to obtain a new replica ID, and such can be generated automatically if the provider follows the standard ID format—or the provider is asked to generate a new replica ID through its ID generation interface if it uses a custom ID format. For example:

```
interface IGlobalIdHandler : IUnknown
{
    HRESULT GetNewReplicaId(
        [in, out, size_is(cbId)] BYTE *pbId,
        [in] ULONG cbId);
```

In a related aspect, the provider can be asked to store the changed replica ID (after committing the ID change). As such, one can attempt to minimize the window between committing new metadata store replica ID and communicating it to the provider. Such method can be called immediately after the transaction successfully commits.

```
interface ISimpleSyncProviderBase : ISyncProvider
{
    HRESULT SetNewReplicaId(
        [in, size_is(cbReplicaId)] BYTE *pbReplicaId,
        [in] ULONG cbReplicaId);
```

Figure 8:
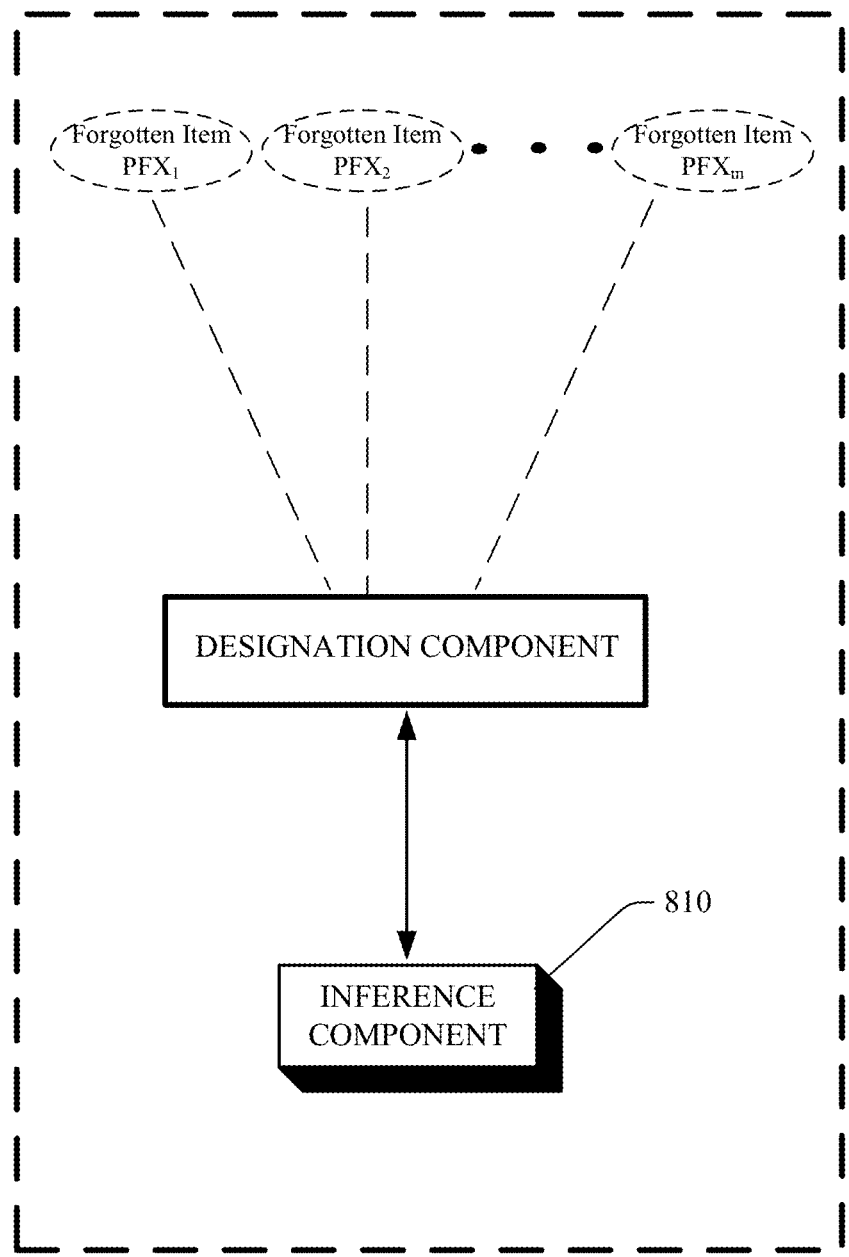
FIG. 8 illustrates an inference component that can facilitate designating items as forgotten items.

FIG. 8 illustrates an inference component 810 that can facilitate designating items as forgotten items. For example, forgetting items can lead to data loss if an item is updated locally and then forgotten before the local change has a chance to propagate to other replicas. Other examples can include when the item did not sync over and different community topologies where even if the item was synced over to one disjoint part of the community, it remains unknown in other parts. In one aspect, the inference component 810 can supply heuristics, which can be employed to disallow forgetting items that were last modified on a local replica. Such can typically ensure that at least one other replica has seen the local changes before such items are designated as forgotten items.

In a related aspect, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The inference component 810 can employ any of a variety of suitable AI-based schemes as described supra in connection with facilitating various aspects of the herein described invention. For example, a process for learning explicitly or implicitly when to designate an item as a forgotten item without loss of data can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

As used in herein, the terms "component," "system", "module" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
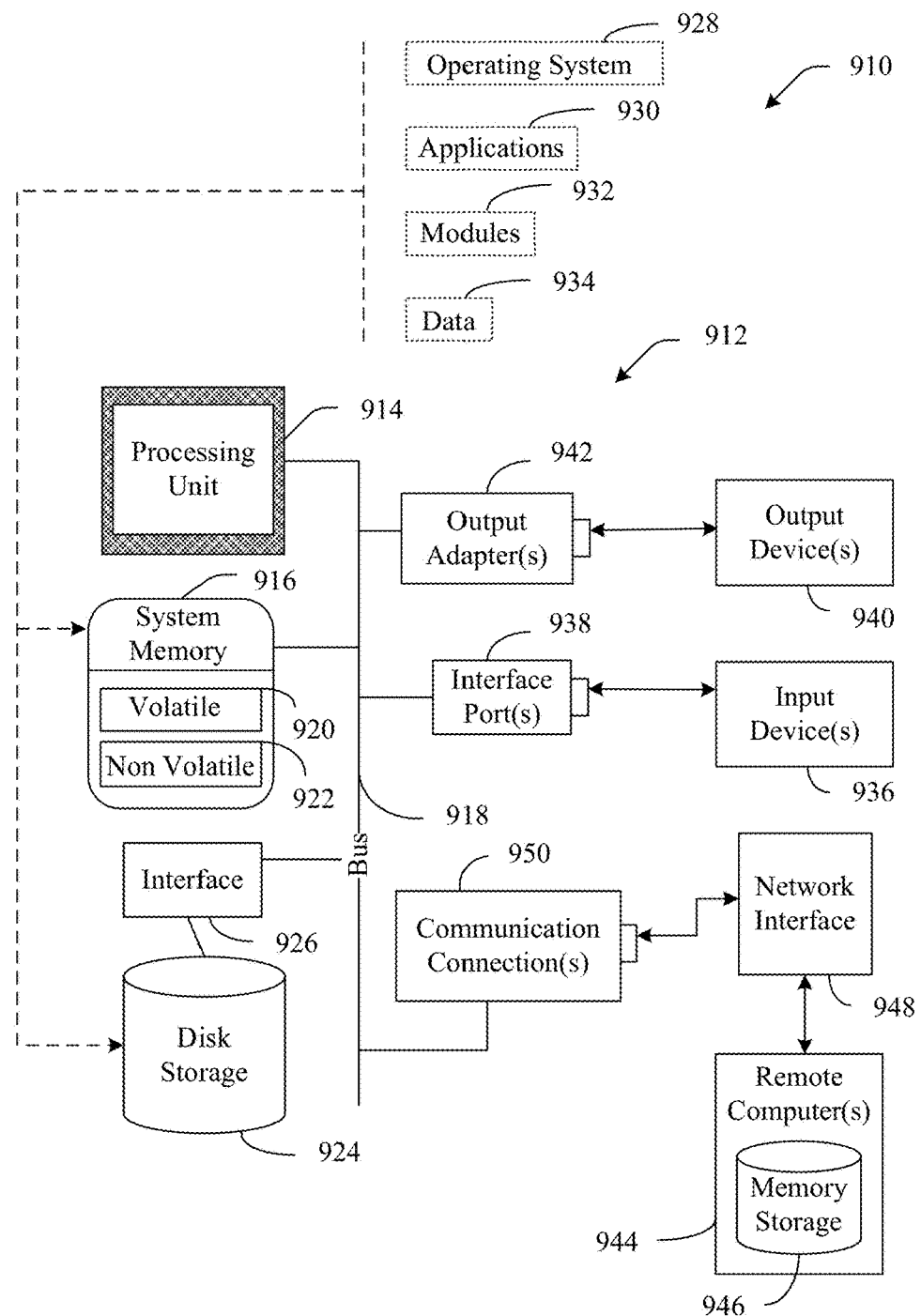
FIG. 9 is a schematic block diagram of a sample-computing environment that can be employed as part establishing a forgotten item in accordance with an aspect of the subject innovation.
Figure 10:
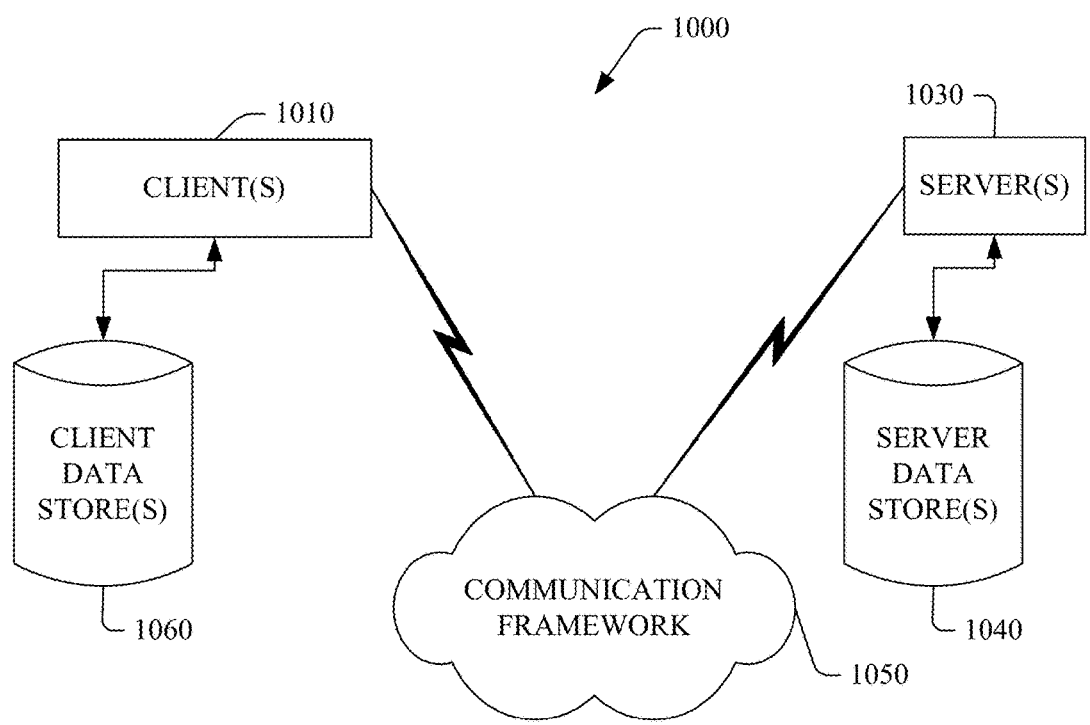
FIG. 10 illustrates an exemplary environment for implementing various aspects of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed as part of synchronizing forgotten items in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
   at least one memory and at least one processor, wherein the at least one memory and the at least one processor are respectively configured to store and execute instructions, including instructions which, upon execution cause the computing device to perform operations for synchronizing data with at least one other computing device, the operations comprising:
   removing an item from the computing device, including:

designating the item as a forgotten item for the computing device, wherein the designation of the item as the forgotten item indicates that the removal of the item is not to be propagated to the at least one other computing device; and automatically reintroducing the removed item to the computing device based on the forgotten item designation of the forgotten item as part of a synchronization of the computing device with the at least one other computing device.

2. The computing device of claim 1, wherein the synchronization of the computing device with the at least one other computing device is after the designation of the item as the forgotten item.

3. The computing device of claim 1, wherein the designation of the item as the forgotten item includes designating the forgotten item as the forgotten item via metadata.

4. The computing device of claim 1, wherein the designation of the item as the forgotten item includes setting a forgotten item designation bit that indicates a forgotten item status.

5. The computing device of claim 1, wherein the removing of the item is based on a local modification count on the computing device for the item.

6. The computing device of claim 5, wherein the removing of the item comprises fully removing data and metadata included in the item, if the item was never modified by the computing device.

7. The computing device of claim 5, wherein the removing of the item comprises a partial removal of data included in the item, in response to the item having been modified at least once by the computing device, wherein the partial removal of the data does not remove synchronization metadata included of the item.

8. The computing device of claim 7, wherein the removing of the item further comprises setting a bit that indicates a forgotten item status.

9. A method performed by a data processing system for managing data synchronization among nodes, the method comprising the following computer executable acts:

removing a forgotten item from a node, including:
designating the item as a forgotten item for the node, wherein the designation of the item as the forgotten item indicates that the removal of the item is not to be propagated to other nodes; and reintroducing the forgotten item to the node automatically based on the forgotten item designation of the forgotten item during a synchronization of the node with at least one of the other nodes.

10. The method of claim 9, wherein the reintroducing of the forgotten item to the node automatically is performed upon a subsequent synchronization.

11. The method of claim 9, wherein the reintroducing comprises performing at least one additional act, in response to a local modification count of the forgotten item being unknown.

12. The method of claim 11, wherein the at least one additional act is at least one of:
keeping a reduced knowledge of the forgotten item;
deferring changes associated with the forgotten item based on awareness of local modifications; or
upon detecting an older version of the forgotten item, raising a conflict or changing a replica identifier (ID) associated with the forgotten item.

13. The method of claim 9 further comprising designating an item that has not been modified locally at the node as the forgotten item.

14. The method of claim 13 further comprising identifying all metadata related to the forgotten item.

15. The method of claim 14 further comprising removing all the metadata.

16. The method of claim 9 further comprising designating an item that has been modified locally as the forgotten item.

17. The method of claim 16 further comprising removing all data associated with the forgotten item from the node except synchronization metadata associated with the forgotten item.

18. The method of claim 9 further comprising:
receiving at the node a first replica knowledge value that represents knowledge of changes to stored data of which a first replica is aware, and
comparing the first replica knowledge value with versions associated with changes to the stored data in a second replica to identify a change known by the second replica of which the first replica is unaware.

19. A method performed by a computer system for managing data synchronization among computing nodes, the method comprising:

removing an item from a node, including:
designating the item as a forgotten item for the node, wherein the designation of the item as the forgotten item indicates that the removal of the item is not to be propagated to the other nodes; and
reintroducing the removed item to the node automatically based on a forgotten item designation of the forgotten item as part of a synchronization of the node with at least one of the other nodes.

20. The method of claim 19, wherein the removing comprising designating the item as the forgotten item via inclusion of an additional bit that indicates a forgotten item status.

* * * * *